Figure 1:
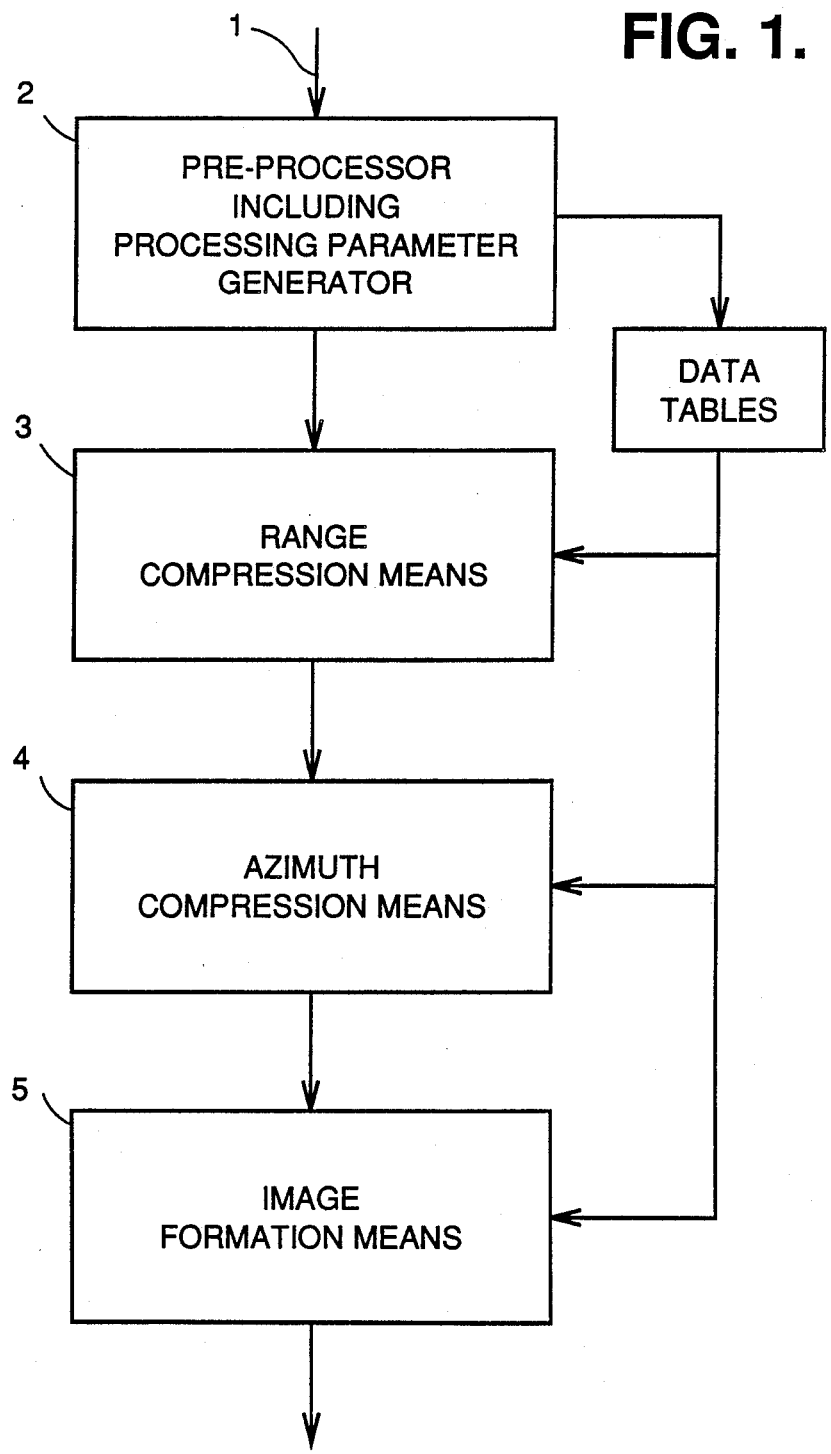

United States Patent [19]

Smith

[11] Patent Number: 4,985,704

[45] Date of Patent: Jan. 15, 1991

[54] PROCESSING PARAMETER GENERATOR FOR SYNTHETIC APERTURE RADAR

[75] Inventor: Andrew M. Smith, Surrey, Great Britain

[73] Assignee: Scicon Limited, Milton Keynes, Great Britain

[21] Appl. No.: 250,630

[22] PCT Filed: Jan. 15, 1988

[86] PCT No.: PCT/GB88/00024

§ 371 Date: Nov. 14, 1988

§ 102(e) Date: Nov. 14, 1988

[87] PCT Pub. No.: WO88/05547

PCT Pub. Date: Jul. 28, 1988

[30] Foreign Application Priority Data

Jan. 17, 1987 [GB] United Kingdom ............... 8700973

[51] Int. Cl.$^5$ ............................................. G01S 13/90
[52] U.S. Cl. ................................................ 342/25
[58] Field of Search ......................................... 342/25

[56] References Cited

U.S. PATENT DOCUMENTS 4,471,357 11/1984 Wu et al. ............................... 342/25

OTHER PUBLICATIONS

H. R. Anderson, "Digital Processing of Synthetic Array Radar Data", IEEE Symposium (1981 International), on Circuits and Systems Proceedings, Apr. 1981, Chicago, Ill., U.S.A., pp. 71–73.

Primary Examiner—Gilberto Barrón, Jr.
Attorney, Agent, or Firm—Gottlieb, Rackman & Reisman

[57] ABSTRACT

A signal processor for synthetic aperture radar comprises a processing parameter generator (17) for generating processor filter parameters for use in squint compensation multiplication means (3) and azimuth replica evaluation (4). The parameter generator products and stores tables of data to be used in the subsequent processing.

3 Claims, 4 Drawing Sheets

PROCESSING PARAMETER GENERATOR FOR SYNTHETIC APERTURE RADAR

The present invention relates to a synthetic aperture processing system for processing data required from Spaceborne or Airborne sensors.

It has been known for many years that images of the earth's surface may be produced using microwave radiation by the technique known as Sideways-Looking Airborne Radar (SLAR). More recently radars carried in space satellites rather than in aircraft have used. However, the basic technique is the same.

SLAR in its simplest form is described by Jensen et al, Side-looking airborne radar, "Scientific American", (1977) and by Lillesand and Keifer, "Remote Sensing and Image Interpretation", Wiley, N.Y., 1979. A vehicle carrying a radar transmitter, e.g. an aircraft, is flown over the surface to be studied. Microwave radiation is emitted from the vehicle and the radiation reflected from the underlying surface is received by the vehicle. Two directions may be defined in relation to the vehicle. The azimuth direction is the direction in which the vehicle is moving. The range direction is the direction at right angles to the direction of movement of the vehicle.

The above mentioned publications describe the operation of SLAR in terms of the emission of pulses of microwave radiation and indicate that the resolution (i.e. the ability to separate two adjacent features on the ground) in the range direction is dependent on the length of the pulse. Commonly a relatively long duration frequency swept pulse is transmitted, in conjunction with a pulse correlation system to achieve an approximately equivalent effect to a short pulse. In the azimuth direction the resolution is dependent on the width of the beam emitted from the vehicle.

It is well known to increase the resolution to the azimuth direction by the technique of synthetic aperture radar. Originally this was done using optical techniques. However it is now possible to replace optical techniques by digital signal processing.

In synthetic aperture radar a vehicle, e.g. an aeroplane or a satellite, carrying a radar aerial or antenna is moved over a surface to be mapped. The radar beam illuminates the surface to be investigated and the movement of the vehicle results in an illuminated or irradiated swath being traced out. As the vehicle moves along its track it emits a succession of radar pulses, typically frequency swept, and receives back radar echoes from each pulse. If the echoes over a given period along track are recorded (sampled) at given time intervals they can be processed to give increased resolution in the azimuth direction. Instead of using a large physical antenna a synthetic aperture is produced. The amplitude of the radar echo at each sampling period is recorded. The echoes which are received after each pulse is emitted result from reflections from objects at successively greater distances from the vehicle. The individual sampled amplitudes can be considered as forming a matrix in which the rows in each column represent information about the illuminated surface in the azimuth direction and the columns represent information about the surface in the range direction. However as initially recorded information about any given object is distributed over the cells of the matrix and it is necessary to compress the data in range and in azimuth to concentrate the data about a given object in a picture cell (pixel) which will be used to represent it in the final image produced.

Synthetic aperture radar using digital signal processing techniques is disclosed in various references. Thus GB No. 1 540 950 discloses a synthetic aperture using an FFT signal processor. The specification explains that synthetic aperture radar may be used in either squinted or in side-looking mode and discusses the problems of maintaining the data from the radar in range and azimuth focus. GB No. 1 540 950 proposes to overcome the problem by using a motion compensation computer responsive to the velocity of the vehicle and pulse repetition frequency to maintain the data in range focus, and to vary the pulse rate frequency of the radar to maintain the data in azimuth focus.

EP No. 83710 discloses a synthetic aperture radar using digital signal processing and discusses the necessity to focus the data in both the range and azimuth directions. The necessity of carrying out range curvature processing is mentioned. This is done to compensate for changes in the distances between the vehicle and a given point from which a signal is reflected.

A considerable number of other approaches to synthetic aperture processing have been described in the literature, of varying applicability, quality and speed of operation. High quality processing has however been restricted to two classes of processor; explicit time domain correlation and range-Doppler frequency domain processing. The primary disadvantage of the time domain correlation approach is that it is computationally demanding although in principle it is as flexible, and provides images of as high a quality, as desired. Frequency domain approaches are of interest because of their computational efficiency, with the best quality achieved prior to this invention by the range-Doppler approach. The basic range-Doppler approach to processing involves the following steps.

(1) Pulse compression, which is performed by correlating pulse echoes intra pulse with a replica of the transmitted signal and achieved either by explicit correlation or frequency domain techniques as appropriate.

(2) Formation of a sequence of overlapping processing blocks of compressed pulse data, with the size of the block and overlap determined by the maximum effective illumination time of a point on the ground by the antenna together with processing considerations.

(3) Interpulse Fast Fourier Transform (FFT) of each processing block at constant range sample, to generate a PRF (Pulse Repetition Frequency) ambiguous, range-Doppler representation of the data.

(4) Formation of a modified range-Doppler processing block by the selection of a new set of rows of data from along curves in the range-Doppler processing block ("Range migration correction"); the locus for data collation corresponding to the range-frequency history of points illuminated by the radar.

(5) The multiplication of rows of data in the modified range-Doppler block by an amplitude weighted phase function derived primarily from the reciprocal of the rate of change of Doppler frequency with time, and an inverse FFT of each row.

(6) The collation of an image from successive blocks of output data.

Operations (2) through (5) are conventionally referred to as the "azimuth compression" operations.

In the general case of a squinted satellite sensor difficulties with this approach arise as a result of the non-stationarity of the processing functions with both range, and position in time, within a processing block, together with the more general problems of correctly specifying the range-Doppler migration locus and conjugate phase function.

Processing of data by this technique from specific sensors within well defined constraints, has been reasonably successful, although implementations are noted for requiring a degree of ad hoc tuning in any given implementation and suffering quality degradation (in comparison with a time domain processor) to various degrees. Further than this, some combinations of radar system parameters may not allow, prior to this invention, full resolution processing to any reasonable quality by this approach.

It would be advantageous to have a systematic and unified approach to range-Doppler processing which was extendable in principle to provide high quality processing for any balance of radar system parameters. It would also be advantageous to be able to engineer the processor to provide image quality as near to ideal as required.

According to the present invention there is provided a signal processor for synthetic aperture radar carried by a moving vehicle and including an antenna, which processor comprises
(a) a processing parameter generator for computation of processor filter parameters from the known vehicle motion and antenna geometry,
(b) range compression means comprising
 (i) pulse FFT means for performing an FFT on pulse echoes,
 (ii) pulse replica multiplication means to effect pulse correlation,
 (iii) squint compensation multiplication means to effect second order migration corrections, and
 (iv) inverse FFT means for performing an inverse FFT on the multiplied and compensated spectral data;
(c) azimuth compression means comprising
 (i) row FFT means for performing an FFT on rows of data selected at constant range from overlapping blocks of range compressed data,
 (ii) azimuth replica evaluator means, comprising range and phase polynomial evaluators and a complex exponentiator
 (iii) azimuth spectral buffer means, comprising a bank of storage to contain an adequately large number of row transforms,
 (iv) data selection means comprising an interpolator to effect selection of data along curves in the spectral buffer according to values computed by the range polynomial evaluator,
 (v) azimuth replica multiplication means to effect multiplication of the selected data with the complex data generated by the phase polynomical evaluators,
 (vi) inverse FFT means to effect the inverse transform of rows of the processed data; and
(d) image formation means comprising image resampling and buffering means to effect image block geometric and phase discontinuity removal and image collation.

The signal processor design of the present invention is capable of processing synthetic aperture data to a high quality. Quality may be enhanced by incorporating further features in the processor depending upon the characteristics of the vehicle and antenna system providing the data. Thus in the azimuth compression means it may be desirable to provide additional precision curvature and migration compensation means comprising a short complex correlator with a non-stationary correcting filter selected according to values computed by the parameter generator, operated in the range dimension.

Such additional precision curvature migration compensation means would probably be unnecessary for data from a 5 GHz satellite with a 0.5 second integration time and modest antenna squint but may be desirable for a satellite operating in a frequency of 1.25 GHz with a 2 second integration time and small antenna squint.

The processor design is based on a novel appreciation of the processing problem, which is (i) to consider the two dimensional transform of the system transfer function;

(ii) to factorise this two dimensional transform in such a way that non stationarities of the system transfer function may be accommodated, and (iii) to compute the elements of the factorisation of the system transfer function in terms of the co-efficients of the range polynomial, which is determined at all points in the image by the known relative motion.

The two dimensional transform of the system transfer function for a point with range and range time derivatives $R_c$, $\dot{R}_c$, $\ddot{R}_c$ etc at some time $T_c$ relative to time of closest point of approach with a corresponding instantaneous Doppler frequency $F_c(f) = -2f/c\, \dot{R}_c$ is approximated as the following two dimensional phase screen as a function of video frequency f and Doppler frequency F:

$$\exp 2\pi i \left[ \left( \frac{-2fR_c}{c} - F_c(f)T_c \right) - T_c(F - F_c(f)) + \right.$$

$$\frac{c}{2f} \frac{1}{\ddot{R}_c} \left( F - \frac{F_c}{2!}(f) \right)^2 + \frac{c}{2f}^2 \frac{\dddot{R}_c}{\ddot{R}_c^3} \frac{(F - F_c(f))^3}{3!} +$$

$$\left. \frac{c}{2f}^3 \frac{(3\dddot{R}_c^2 - \ddot{R}_c \ddddot{R}_c)}{\ddot{R}_c^5} \frac{(F - F_c(f))^4}{4!} + \ldots \right] = \exp 2\pi i \theta(f,F)$$

Factorisation is achieved by expanding $\theta(f,F)$ as a Taylor series about $f_o$, the centre video frequency; thus $$\theta(f,F) = \theta(f_o,F) + \partial\theta/\partial f(f_o,F)(f-f_o) + g(f,F)$$

The function g(f,F), representing the residual terms may be considered by its expansion about a central Doppler frequency $\hat{F}_c$ and $f_o$;

$$g(f,F) = \frac{\delta^2 \theta}{\delta f^2} (f_o,\hat{F}_c) \frac{(f - f_o)^2}{2!} + \epsilon(f - f_o, F - \hat{F}_c) \cdot$$

$$\frac{\delta^2 \theta}{\delta f^2} (f_o,\hat{F}_c) = \frac{2}{cf_o} \frac{\dot{R}_c^2}{\ddot{R}_c},$$

and provides the primary migration correction for the squint multiplication means b(iii).

$$\frac{-c}{2} \frac{\delta \theta}{\delta f} (f_o,F)$$

provides range-Doppler selection curves which can be used by the data selection means in the azimuth compression means, and $\theta(f_o,F)$ provides the azimuth phase replica used by the azimuth replica multiplication means.

Comparison of these parameters computed at the edges of the processing block with those applied during azimuth compression provides the resampling and phase adjustment parameters used by the image formation means.

The residual non stationary correlations used by the additional precision curvature and migration compensation means (if present) and by the image formation means are determined by the function $\epsilon$ and are applied in range, in range-Doppler space and in along track, in image space respectively. The residual compensation required is very substantially reduced by the use of the preliminary compensation during range compression, such that further corrections may be applied by correlation with short pretabulated filter functions, determined by the difference between the two dimensional frequency domain transfer function applied and that which should have been applied on the basis of the local range polynomial coefficients.

The invention is illustrated by reference to FIG. 1 which shows a version of the processor appropriate to a satellite mounted radar at 800 km altitude, 5 GHz operating frequency and squint less than 30 KHz. The version illustrated omits the additional precision curvature and migration compensation means. The range replica multiplication means and squint compensation multiplication means are combined by pre-multiplication of the range frequency domain replica with the primary migration correction. The invention may be implemented either as a software product on some appropriate general purpose architecture, or may be constructed in hardware as a special purpose fast processor.

A particularly preferred form of parameter generator comprises a signal processor of the described class wherein the parameter generator comprises (1) means for computing the latitude and longitude of points approximately in the beam centre at the near, far and centre swath positions on the earth's surface at times, corresponding approximately to the start, centre and end pulses of the processing block;

(2) means for computing the time offset of each of these points from the closest point of approach and the minimum range at the closest point of approach;

(3) means for evaluating the range, Doppler frequency and successive derivatives of the range with respect to time at the given time;

(4) means for quadratically fitting the calculated parameters as a function of minimum range;

(5) means for generating parameters for each output range pixel comprising means for: determining the range polynomial coefficients by quadratic expansion using the required minimum range values;

(6) means for computing block geometric and phase correction factors; and (7) means for computing block collation parameters.

Figure 2:
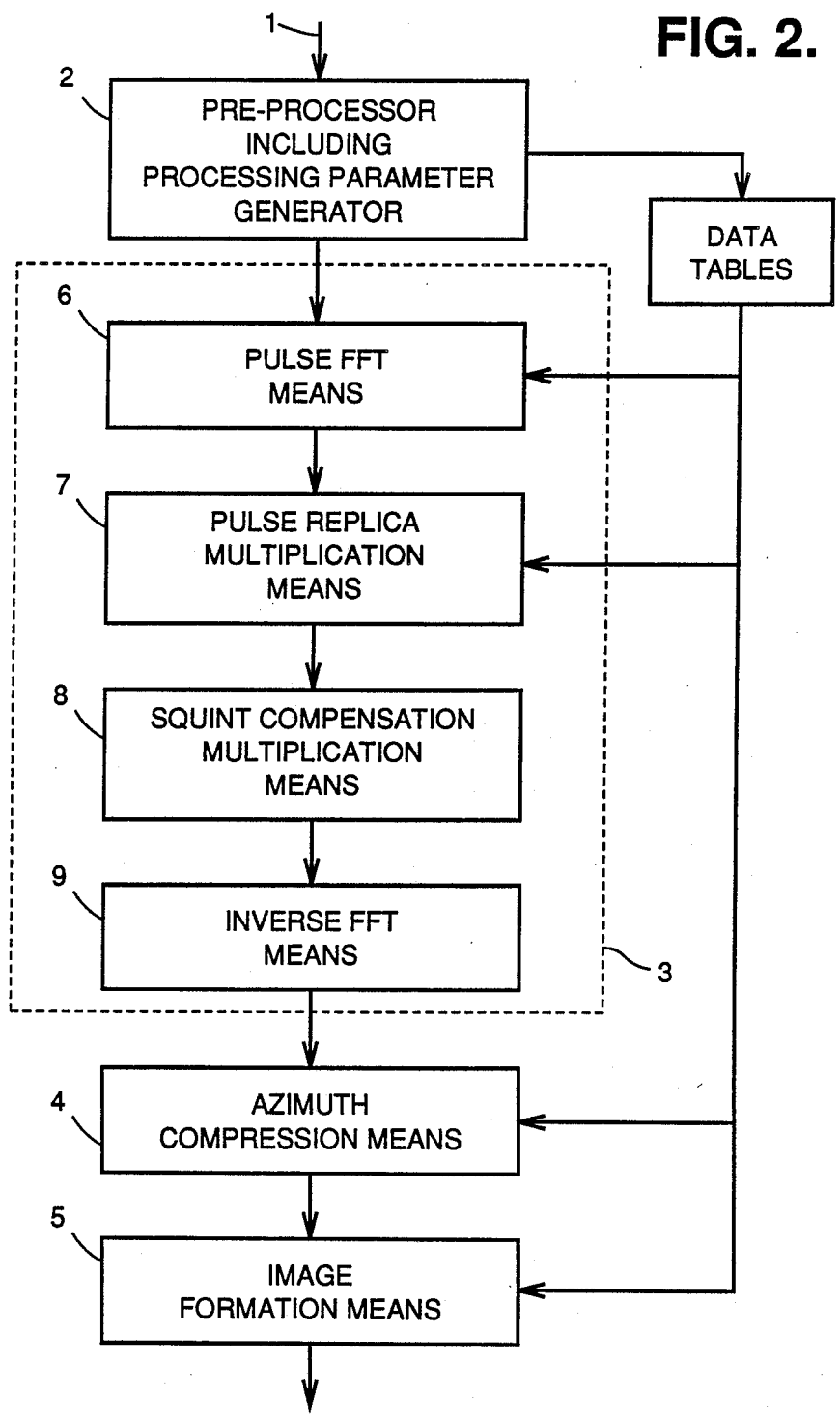
Figure 3:
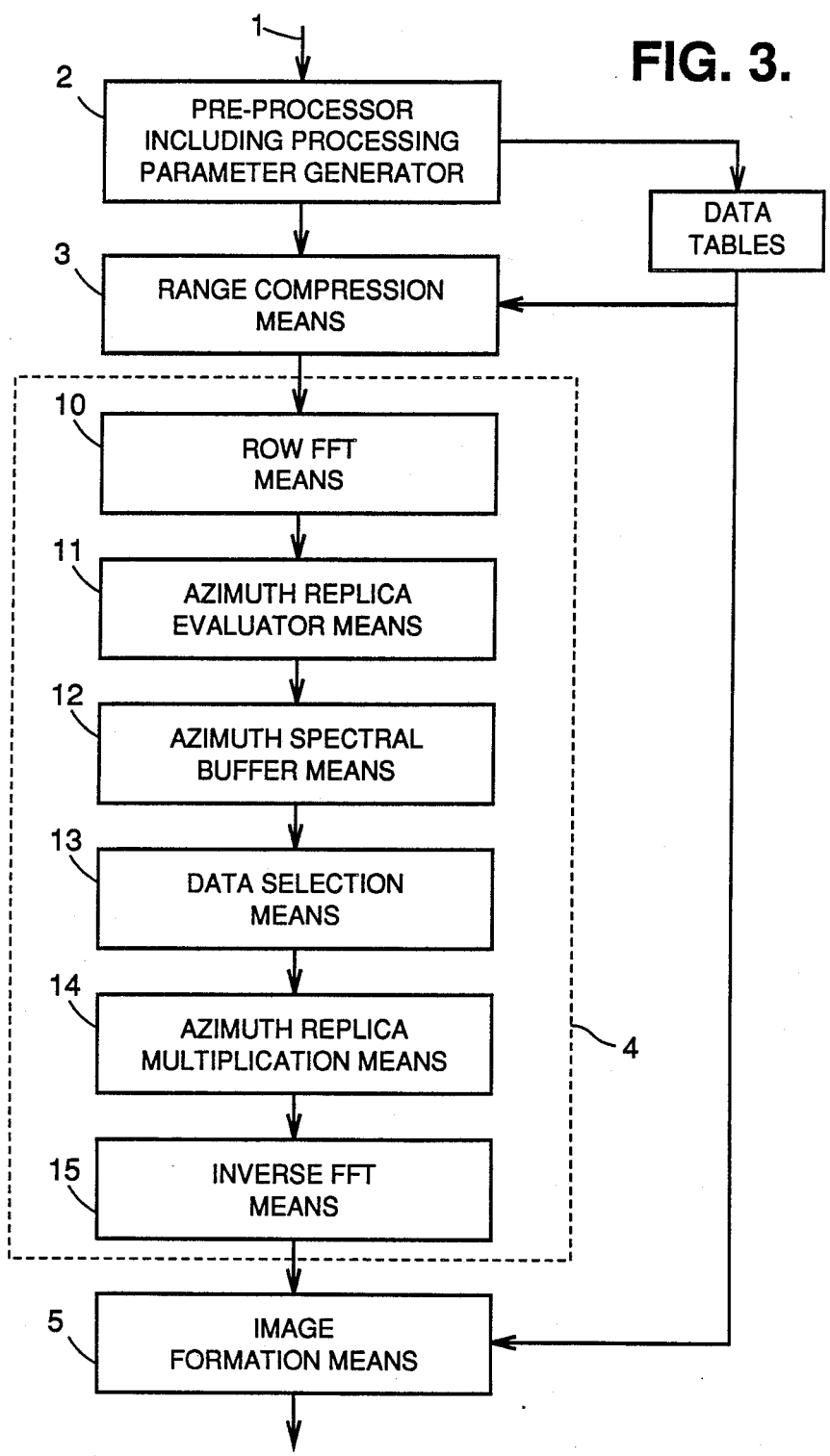
Figure 4:
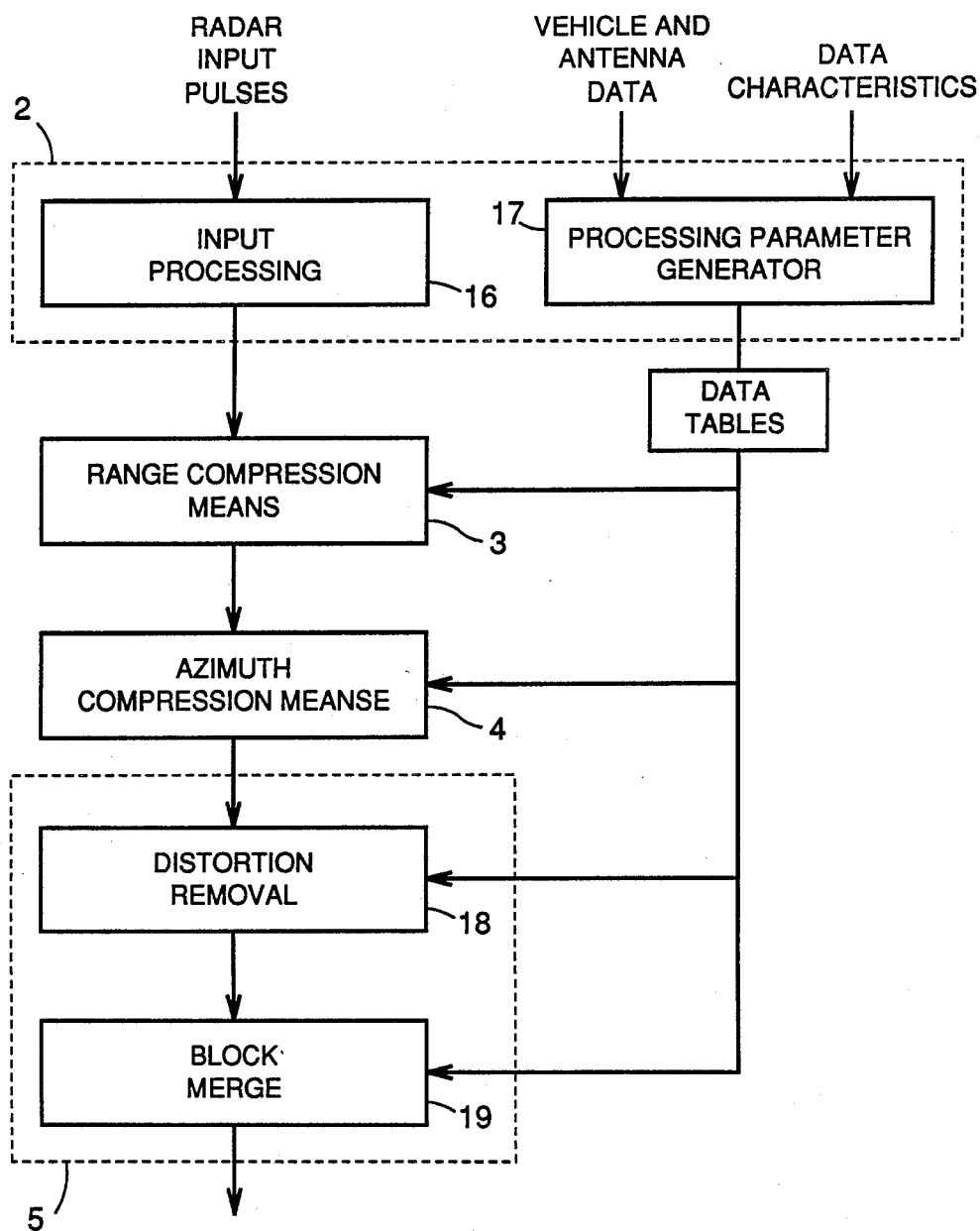

The invention will now be further described with reference to the drawings where FIG. 1 is a diagrammatic representation of the main elements of the processor, FIG. 2 is a more detailed diagrammatic representation of a range compression means of the processor, FIG. 3 is a more detailed diagrammatic representation of the azimuth compression means, and FIG. 4 is a detailed diagrammatic representation of a specific processor according to the invention.

The processor may be described as operating fundamentally according to a range-Doppler processing principles, but incorporating many novel features and principles.

FIG. 1 shows the basic structure of the processor namely a preprocessor which receives data produced by for example a satellite, and includes a processing parameter generator which generates and stores a table of parameters for use by the successive parts of the processor. Data from the preprocessor is fed in turn to a range compression means 3, an azimuth compression means 4 and an image formation means 5 which generates the final radar image. FIG. 2 shows the range compression means 3 in more detail. It comprises a pulse FFT means 6, a pulse replica multiplication means 7, a squint compensation multiplication means 8 and an inverse FFT means 9. FIG. 3 shows the azimuth compression means 4 in more detail. This comprises a row FFT means 10, an azimuth replica evaluator means 11, an azimuth spectral buffer means 12, a data selection means 13, an azimuth replica multiplication means 14 and an inverse FFT means 15.

FIG. 4 shows the preprocessor and image formation means in more detail. The preprocessor 2 comprises an input processing means 16 which carries out conventional preprocessing of the radar pulses e.g. recorded from a satellite before feeding them to the range compression means. Processing parameter generator 17 receives information about the orbit of the satellite producing the radar pulses together with additional information fed in by the operator of the processor, and information from the input processing of the radar pulses. The processing parameter generator generates and stores the parameters required by the range compression, azimuth compression and image formation means. The image formation means 5 comprises distortion removal means 18 and block merge means 19.

A key element of the design is the processing parameter generator which generates data tables to allow signal processing to operate as a sequence of one dimensional vector operations. Accordingly the operation of the parameter generator and the contents of the data tables that it generates are described first, with the operation of the processor as a whole described with reference to these tables.

PARAMETER GENERATOR

The primary inputs to the parameter generator are information concerning the relative motion of the platform to the surface to be imaged and the pointing angle and orientation of the antenna. Such data may be typically provided as sampled values of platform vector position and vector time derivatives, sampled values of platform pitch roll and yaw and system parameters describing the orientation of the boresight and boresight plane to the platform co-ordinate system.

Further inputs to the generator comprise information concerning the data start time and data sampling offsets, the radar parameters, the size of image to be generated, the dimensions of processing block sizes to be used and the maximum duration of illumination of any point on the ground to be imaged.

The generator performs the following functions:

(i) It fits a spline to the sampled relative motion and pointing angles of the platform and its antenna, such that the vector position, vector velocity, vector acceleration and orientation of the platform may be evaluated at any required point in time; spline fitting procedures are well known to those skilled in the art;

(ii) It evaluates a centre time for each processing block according to $T_n = T_{n-1} + (N\_AZFFT - N\_AZREP)/PRF$, where N_AZFFT is the defined processing block size in pulses, PRF is the system pulse repetition frequency, and N_AZREP is the maximum illumination time multiplied by the PRF; $T_1$ is provided by the time of the first pulse plus $N\_AZFT/2PRF$; and evaluates a start and end pulse index for each processing block according to $PRF * T_n \pm N\_AZFFT/2$.

(iii) It computes, for each processing block, at times $T_n$ and $T_n \pm (N\_AZFFT - N\_AZREP)/2PRF$, coordinates of points on the surface to be imaged in the beam centre at the near side, far side and centre of the illuminated swath. The computation of the coordinates of such points is a routine problem in trigonometry and vector analysis and familar to those skilled in the art.

(iv) It computes, for each such point at such times, the range from the platform to the point, $\Delta R$, and its successive time derivatives according to:

$$\Delta R = |\Delta R|$$

$$\Delta \dot{R} = \frac{(\Delta R \cdot \dot{R})}{\Delta R}$$

$$\Delta \ddot{R} = (\dot{R} \cdot \dot{R} + \Delta R \cdot \ddot{R} - \Delta \dot{R}^2)/\Delta R$$

$$\Delta \dddot{R} = (\Delta R \cdot \dddot{R} + 3(\dot{R} \cdot \ddot{R} - \Delta \dot{R} \Delta \ddot{R}))/\Delta R,$$

where R, R etc, are the platform relative vector time derivatives; computes, for each such point at such times, the time offset of the point to its time of closest approach to the satellite, $\Delta T$, and the corresponding slant range at closest approach, $\Delta R_{cpa}$, by numerical minimisation of $(\Delta R(T) \cdot \dot{R}(T))$ according to procedures familiar to those skilled in such art; computes an approximate fourth time derivative of the scalar range according to:

$$\Delta \ddddot{R} = -6.0(\Delta \dot{R} + \Delta \ddot{R} \Delta T + \Delta \dddot{R} \Delta T^2/2.0)/\Delta T^3$$

so that the extrapolated truncated slant range polynomial satisfies $\Delta R(T) = 0$ at time of closest approach; and computes a centre Doppler frequency for each such point at such times according to $$F_c = -2f_o/c \, \Delta \dot{R}$$

(v) It evaluates for each processing block, at each such times, the coefficients of a quadratic fit of each of $\Delta R, \Delta \dot{R}, \Delta \ddot{R}, \Delta \dddot{R}, \Delta \ddddot{R}, F_c$ and $\Delta T$ as functions of minimum slant range, $\Delta R_{cpa}$.

(vi) It evaluates, for each processing block, at each such times, for each output minimum range pixel position required, $\Delta R, \Delta \dot{R}, \Delta \ddot{R}, \Delta \dddot{R}, \Delta \ddddot{R}, F_c$ and $\Delta T$ by expansion of the quadratic fitting coefficients.

(vii) It evaluates, for each such output minimum range pixel position required, the coefficients of slant range and phase Doppler frequency polynomials, expanded with reference to the centre frequency at the centre of the processing block $F_{BS}$, according to:
$R(F) = R(1) + R(2)(F - F_{BS}) + R(3)(F - F_{BS})^2 + R(4)(F - F_{BS})^3$
$\theta(F) = \theta(1) + \theta(2)(F - F_{BS}) + \theta(3)(F - F_{BS})^2 + \theta(4)(F - F_{BS})^3$
where the coefficients $R(1)$-$R(4)$, $\theta(1)$-$\theta(4)$ are initially evaluated according to the local centre frequency $F_c$ and re-expanded with respect to $F_{BS}$ according to:

$R(1) = R'(1) + R'(2)(F_{BS} - F_c) + R'(3)(F_{BS} - F_c)^2 + R'(4)(F_{BS} - F_c)^3$
$R(2) = R'(2) + 2R'(3)(F_{BS} - F_c) + 3R'(4)(F_{BS} - F_c)^2$
$R(3) = R'(3) + 3R'(4)(F_{BS} - F_c)$
$R(4) = R'(4); \theta(1)-\theta(4)$ similarly, where
$R'(1)-R'(4)$ are given in sample units by:
$R'(1) = (\Delta R \text{-slant range to first sample})/\Delta r;$ $$R'(2) = -\left[\frac{c}{2f_o}\right] \frac{\Delta \dot{R}}{\Delta R \Delta r}$$

$$R'(3) = \left[\frac{c}{2f_o}\right]^2 \frac{(\Delta \dot{R}^2 - \Delta R \Delta \ddot{R})}{2\Delta R^3 \Delta r}$$

$$R'(4) = -\left[\frac{c}{2f_o}\right]^3 \frac{(3\Delta R \Delta \ddot{R}^2 - \Delta \dot{R} \Delta \ddot{R} \Delta \dddot{R} - 2\Delta \ddot{R} \Delta \dot{R}^2)}{6\Delta R^5 \Delta r};$$

where $\Delta r$ is the range sample width in units of slant range; $\theta'(2)$-$\theta'(4)$ are given by:

$$\theta'(2) = \Delta T$$

$$\theta'(3) = \left[\frac{c}{2f_o}\right] \cdot \frac{1}{2\Delta \dot{R}}$$

$$\theta'(4) = \left[\frac{c}{2f_o}\right]^2 \frac{\Delta \ddot{R}}{6\Delta \dot{R}^3};$$

and the phase origin $\theta'(1)$ is determined by the quadratic fitting coefficients of $\Delta T$ and $F_c$ as functions of $\Delta R_{cpa}$; with a,b,c,d defined by:
$\Delta T(\Delta R_o) = \Delta T_{mid} + a(\Delta R_o - \Delta R_{mid}) + b(\Delta R_o - \Delta R_{mid})^2$
$F_c(\Delta R_o) = F_{c\ mid} + c(\Delta R_o - \Delta R_{mid}) + d(\Delta R_o - \Delta R_{mid})^2;$
$\theta'(1)$ at $\Delta R_o$ is evaluated according to
$\theta'(1) = \Delta T_{mid} \cdot c \cdot \Delta R_o + \frac{1}{2}(ac + 2\Delta T_{mid} \cdot d)(\Delta R_o - \Delta R_{mid})^2 + \frac{1}{3}(bc + 2ad)(\Delta R_o - \Delta R_{mid})^3 + \frac{1}{2}bd(\Delta R_o - \Delta R_{mid})^4.$ (viii) It computes, for each processing block, for each Doppler frequency column a table of parameters of the form of a set of values providing: the number of output samples to be generated at a given frequency offset, and a frequency offset $\Delta F$ which is $(F - F_{BS})$ together with its second and third powers; the table is computed according to the following procedure: First, for each output row to be generated during range migration correction, the column notionally dividing high and low Doppler frequencies (the "wrap around boundary") is computed from knowledge of the local centre Doppler frequency; then for the first row, the table is initialised for each column according to the relative position of the column to the wrap around boundary; then for each subsequent row, the table entries are modified according to whether a column shift in the wrap around boundary has occurred;

(ix) It computes and tabulates for each processing block a phase adjustment for incorporation into the frequency domain range compression replica, the "linear range migration correction", according to:

$$F(f) = \exp - 2\pi i \left[\frac{2}{cf_o} \frac{\Delta \dot{R}_c^2}{\Delta \dot{R}_c} \frac{(f - f_o)^2}{2}\right],$$

where $\Delta \dot{R}_c$, $\Delta \ddot{R}_c$ are taken from representative centre block values of $\Delta \dot{R}$ and $\Delta \ddot{R}$.

(x) It computes and tabulates for each processing block n, for each output row $R_o$ the absolute image start and end pixel indices according to:

start index$_n(R_o)$ = end index$_{n-1}(R_o)$ + 1
end index$_n(R_o)$ = INT(PRF*$T_n$ + (N_AZFFT−N_AZREP)/2 + PRF*$\Delta T_n(R_o)$)
with end index$_o(R_o)$ = INT(PRF*$T_1$ − (N_AZFFT−N_AZREP)/2 + PRF*$\Delta T_1(R_o)$)

(xi) It computes for each processing block, for each output row a geometric "stretch factor" to correct for residual block geometric distortion, according to:

$$\text{stretch factor }(R_o) = 1 - \frac{\Delta\dot{\theta}}{\Delta TCPA}, \text{ where}$$

$\Delta\dot{\theta} = (\theta_R(2) - \theta_L(2)) + 2.0 * (\theta_R(3) \cdot (F_c - F_{BSR}) -$ $\theta_L(3)(F_c - F_{BSL})) + 3.0 * (\theta_R(4)(F_c - F_{BSR})^2 -$ $\theta_L(4)(F_c - F_{BSL})^2)$, $\Delta TCPA = (N\_AZFFT - N\_AZREP)/PRF + \Delta T_R(R_o) -$ $\Delta T_L(R_o)$, where the suffices R and L relate to function values evaluated at end and start of the processing block respectively; computes for each processing block, for each output row, a real, that is fractionally valued, start sample modulo the processing block according to:

start sample$_n$ $(R_o)$ = (start index$_n(R_o)$ + (1−stretch factor$_n(R_o)$)* (end index$_n(R_o)$ + 1 − start index$_n(R_o)$)/2)-mod N_AZFFT and tabulating: start sample$_n(R_o)$, stretch factor$_n(R_o)$ and (end index$_n(R_o)$ − start index$_n(R_o)$ + 1);

(xii) It computes, for each processing block, for each output row, an approximate centre frequency $F_{CINT}(R_o)$ which is a multiple of PRF/N_AZFFT, and the corresponding column offset $\Delta COL(R_o)$ according to:

$$F_{CINT}(R_o) = \frac{PRF}{N\_AZFFT} \times INT(F_c \times N\_AZFFT/PRF)$$

$$\Delta COL(R_o) = (F_c \bmod PRF) \times N\_AZFFT/PRF$$

(xiii) It computes and tabulates for each processing block, for each output row, a heterodyning frequency, $F_{HET}(R_o)$, and a phase offset, $\phi(R_o)$, according to:

$$F_{HET}(R_o) = \frac{\Delta\theta(R_o)}{\Delta T_{CPA}(R_o)} - F_{CINT}(R_o)$$

$$\phi(R_o) = -\frac{\Delta\theta(R_o)}{\Delta T_{CPA}(R_o)} * T_{CENTRE}$$

where:

$\Delta\theta(R_o) = (\theta_R(1) - \theta_L(1)) + (\theta_R(2)(F_c - F_{BSR}) -$ $\theta_L(2)(F_c - F_{BSL})) + (\theta_R(3)(F_c - F_{BSR})^2 - \theta_L(3)(F_c - F_{BSL})^2) +$ $(\theta_R(4)(F_c - F_{BSR})^3 - \theta_L(4)(F_c - F_{BSL})^3)$ $\Delta TCPA(R_o) = (N\_AZFFT - N\_AZREP)/PRF + \Delta T_R(R_o) -$ $\Delta T_L(R_o)$ $T_{CENTRE} = \Delta T_n(R_o) + N\_AZFFT/2PRF$ (xiv) It tabulates operator specified range and azimuth compression weighting functions.

DATA TABLES

The following tables are generated for each processing block:

Block Control (i) Start pulse
(ii) End pulse
(iii) For each output image row: start and end image pixel location.

Range Compression (i) Frequency domain pulse reference × g(f) × user specified weighting function.

Azimuth Compression (i) For each output image row:
R(1), R(2), R(3), R(4) coefficients
$\theta(1)$, $\theta(2)$, $\theta(3)$, $\theta(4)$ coefficients
(ii) For each Doppler frequency column (N_AZFFT):
For each wraparound:
Number of output rows to be generated
$\Delta F$, $\Delta F^2$, $\Delta F^3$ where $\Delta F$ is the difference between the column frequency and the centre block expansion frequency.
(iii) For each output image row:
$\Delta COL$
$F_{HET}$
$\phi$
(iv) For each output image row:
start sample
stretch factor
number of samples to output.
(v) User specified azimuth compression weighting function.

Range Compression

The system loads each pulse, performs an FFT, multiplies the spectral data by the tabulated range compression replica, performs an inverse FFT and outputs the range compressed data; the range compression replica is selected according to the relevant processing block but the update rate is non-critical; the fine detail of the process is well known to those skilled in this art.

Azimuth Compression

Data is processed in overlapping blocks, defined by the block start and end pulse indices. An FFT at constant range is performed on each row of each block; for each frequency column a sampling comb and phase conjugate function is generated, according to:
For each wraparound:
For each output row:
$R_{INDX}(R_o) = R(1) + R(2)\Delta F + R(3)\Delta F^2 + R(4)\Delta F^3$
$\theta(R_o) = 2\pi*(\theta(1) + \theta(2)\Delta F + \theta(3)\Delta F^2 + \theta(4)\Delta F^3)$;
For each column, data is interpolated to generate a new column, defined by the sampling comb $R_{INDX}(R_o)$, by procedures known to those skilled in this art, and multiplied by exp-i$\theta(R_o)$. Each row of this modified block is then logically shifted in a cyclic fashion by $\Delta COL$, multiplied by the user specified azimuth compression weighting function and an inverse FFT performed; For each resulting row a sampling comb, $A_{INDX}$, and phase function, $\theta$, are generated according to: $A_{INDX}(N) = ($−start sample + (N−1)×stretch factor) mod N_AZFFT, for N=1 to number of samples to output;

$$\theta_{(N)} = 2\pi * \left( \phi + \frac{F_{HET}}{PRF} \times \right.$$

$$\left. \text{(start image location} + (N-1) - \text{start pulse)} \right);$$

and a modified row is interpolated according to the cyclic sampling comb $A_{INDX}$, according to procedures known to those skilled in such art, and each resulting pixel is multiplied by exp-$i\theta(N)$. The resulting block of output image is then output to storage.

Block Merge

The final coherent image is assembled row by row from the contiguous blocks of image data; each row is offset in the image frame by the start pixel location of the row in the first image block less the minimum start pixel location.

The resulting coherent image is obtained in coordinates of minimum slant range and time of closest approach, is at baseband with respect to the range dimension and at offset Doppler frequencies provided by the $F_{HET}$ tabulation.

I claim:

1. A signal processor for synthetic aperture radar carried by a moving vehicle including an antenna, the radar using a beam which has a centre and is scanned over a surface to be imaged and mapped so as to trace out thereon a swath having near, far and centre positions, which processor comprises
   (a) a processing parameter generator including processing blocks, the processing parameter generator serving for computation of processor filter parameters from the vehicle motion and antenna geometry as a continuously updated function of time,
   (b) range compression means comprising
      (i) pulse FFT means for performing an FFT on pulse echoes,
      (ii) pulse replica multiplication means to effect pulse correlation,
      (iii) squint compensation multiplication means to effect second order migration correction, and
      (iv) inverse FFT means for performing an inverse FFT on the multiplied and compensated spectral data;
   (c) azimuth compression means comprising
      (i) row FFT means for performing an FFT on rows of data selected at constant range from overlapping blocks of range compressed data,
      (ii) azimuth replica evaluator means, comprising range and phase polynomial evaluators and a complex exponentiator,
      (iii) azimuth spectral buffer means, comprising a bank of storage to contain an adequately large number of row transforms,
      (iv) data selection means comprising an interpolator to effect selection of data along curves in the spectral buffer means according to values computed by the range polynomial evaluator,
      (v) azimuth replica multiplication means to effect multiplication of the selected data with the complex data generated by the phase polynomical evaluators, and
      (vi) inverse FFT means to effect the inverse transform of rows of the processed data; and
   (d) image formation means comprising image resampling and buffering means to effect image block geometric and phase discontinuity removal and image collation.

2. A signal processor according to claim 1 wherein the processing parameter generator comprises
   (1) means for computing the latitude and longitude of points approximately in the beam centre at the near, far and centre swath positions on the surface at times corresponding approximately to respective start, centre and end pulses of each processing block;
   (2) means for computing the time offset of each of these points from a closest point of approach and the minimum range at the closest point of approach;
   (3) means for evaluating range, Doppler frequency and successive derivatives of the range with respect to time at a given time;
   (4) means for quadratically fitting calculated parameters as a function of minimum range;
   (5) means for generating parameters for each of a plurality of output range pixels comprising means for: determining range polynomial coefficients by quadratic expansion using required minimum range values;
   (6) means for computing block geometric and phase correction factors; and
   (7) means for computing block collation parameters.

3. A signal processor according to claims 1 or 2 wherein the processing parameter generator has means for generating and storing for each of a plurality of blocks of data to be processed to produce the image, the following data tables;
   a block control data table comprising a start pulse, an end pulse and a start and end image pixel location for each of a plurality of output rows;
   a range compression data table comprising the product of a frequency domain pulse reference, and g(f), where g(f) is $$\exp\left(-2\pi i \left[ \frac{2}{c/f_o} \frac{\Delta \dot{R}_c^2}{\Delta \ddot{R}_c} \frac{(f-f_o)^2}{2} \right]\right),$$

f is the bandwidth, $f_o$ is the centre video frequency, $\Delta \dot{R}_c$ is the first time derivative of range, and $\Delta \ddot{R}_c$ is the second time derivative of range, and a predetermined weighting function; and
   an azimuth compression data table including rows and column of Doppler frequency data and comprising for each of a plurality of output image rows
      (i) coefficients of slant range polynomials of Doppler frequency expanded with reference to a centre frequency at the centre of a processing block;
      (ii) for a respective column of Doppler frequency data dividing high and low Doppler frequencies in each Doppler frequency data column, the number of output rows to be generated, and $\Delta F$, $\Delta F^2$ and $\Delta F^3$, where $\Delta F$ is the difference in absolute Doppler frequency between the column frequency and a centre block expansion frequency;
      (iii) for each of a plurality of output range rows, a column offset, a heterodyning frequency and a phase offset;
      (iv) for each output image row, a start sample, a stretch factor, and a number of samples to output; and
      (v) a predetermined azimuth compression weighting function.

* * * * *